US012468239B2

(12) United States Patent
Lee et al.

(10) Patent No.: US 12,468,239 B2
(45) Date of Patent: Nov. 11, 2025

(54) PREVENTION OF CRUM CHIP MALFUNCTION THROUGH LOCK CONTROL OF CONSUMABLE UNIT

(71) Applicant: Hewlett-Packard Development Company, L.P., Spring, TX (US)

(72) Inventors: Youngjae Lee, Suwon (KR); Jaeyoon One, Seongnam Si (KR); Kiyoung Lee, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/701,712

(22) PCT Filed: Sep. 26, 2022

(86) PCT No.: PCT/US2022/044669
§ 371 (c)(1),
(2) Date: Apr. 16, 2024

(87) PCT Pub. No.: WO2023/069224
PCT Pub. Date: Apr. 27, 2023

(65) Prior Publication Data

US 2024/0419098 A1 Dec. 19, 2024

(30) Foreign Application Priority Data

Oct. 19, 2021 (KR) ........................ 10-2021-0139669

(51) Int. Cl.
*G03G 15/00* (2006.01)
*G03G 15/08* (2006.01)
(Continued)

(52) U.S. Cl.
CPC ..... *G03G 15/0863* (2013.01); *G03G 15/5004* (2013.01); *G03G 15/556* (2013.01);
(Continued)

(58) Field of Classification Search
CPC ............... G03G 15/0863; G03G 15/50; G03G 15/5004; G03G 15/556; G03G 21/1623;
(Continued)

(56) References Cited

U.S. PATENT DOCUMENTS

2010/0272452 A1 10/2010 Tsukijima
2013/0293922 A1* 11/2013 Lee .................... G03G 21/1633 358/1.14
2020/0198357 A1 6/2020 Schmidt et al.

FOREIGN PATENT DOCUMENTS

EP 2431812 A2 3/2012
EP 3638509 A1 4/2020
(Continued)

*Primary Examiner* — Sophia S Chen
(74) *Attorney, Agent, or Firm* — Brooks, Cameron & Huebsch, PLLC

(57) ABSTRACT

An example image forming apparatus includes a locking unit to lock a consumable unit to the image forming apparatus, the consumable unit including a customer replaceable unit monitoring (CRUM) chip, a CRUM power supply to supply power to the CRUM chip, and a main controller to perform an image forming job using the consumable unit, to record a usage history of the consumable unit according to the image forming job on the CRUM chip by communicating with the CRUM chip, to, based on a consumable unit extract command being input during the communication with the CRUM chip, end the communication with the CRUM chip and control the CRUM power supply to cut the power supplied to the CRUM chip, and, based on the power cutting, control the locking unit to unlock the consumable unit.

15 Claims, 11 Drawing Sheets

(51) Int. Cl.
*G03G 21/16* (2006.01)
*G03G 21/18* (2006.01)

(52) U.S. Cl.
CPC ..... *G03G 21/1633* (2013.01); *G03G 21/1889* (2013.01); *G03G 2221/1654* (2013.01)

(58) Field of Classification Search
CPC ........... G03G 21/1633; G03G 21/1642; G03G 21/1878; G03G 21/1889; G03G 2221/1654
See application file for complete search history.

(56) References Cited

FOREIGN PATENT DOCUMENTS

| | | | |
|---|---|---|---|
| JP | 2000-196453 | A | 7/2000 |
| JP | 2011-201193 | A | 10/2011 |
| KR | 10-2012-0028794 | A | 3/2012 |

* cited by examiner

PREVENTION OF CRUM CHIP MALFUNCTION THROUGH LOCK CONTROL OF CONSUMABLE UNIT

BACKGROUND

An image forming apparatus refers to an apparatus to print print data generated by a terminal apparatus such as a computer on a recording printing medium. Examples of such an image forming apparatus may include a copier, a printer, a facsimile, a multi-function peripheral (MFP) including functions of these in combination as one apparatus, and the like.

BRIEF DESCRIPTION OF THE DRAWINGS

Various examples will be described below by referring to the following figures.

DETAILED DESCRIPTION

Examples described below are provided to assist in an understanding of the disclosure and it should be understood that the disclosure may be modified and performed variously unlike in the examples described herein.

The terms used in the specification and claims have been selected as general terms in consideration of functions in the disclosure. But, these terms may vary in accordance with precedent, technical interpretation, the emergence of new technologies, and the like.

In addition, the specification may include terms arbitrarily selected by the applicant. Such terms may be interpreted as defined in this specification and may be interpreted based on general content of the specification if there are no specific term definitions.

Further, in the specification, elements for describing each example of the disclosure are included, but there is no limitation thereto. Therefore, some elements may be changed or omitted and other elements may be added. In addition, the elements may be divided and disposed in different independent devices.

In the disclosure, the expression that a certain component is "connected" to another component includes a case in which the components are "directly connected to each other", and also a case in which the components are "connected to each other with another component interposed therebetween". In addition, a component that is described to "include" another component, may include still another component, rather than excluding it, unless otherwise noted.

In describing the disclosure, it should be understood that the order of each operation is not limited, unless a previous operation should be performed before a subsequent operation logically or temporally. In other words, other than the above exceptions, the gist of the disclosure is not affected even if the process described as the subsequent operation is performed before the process described as the previous operation, and a scope of a right also should be defined regardless of the order of operations.

Examples of the disclosure will be described with reference to the accompanying drawings and description in the accompanying drawings, but the disclosure is not limited by the examples.

Figure 1:
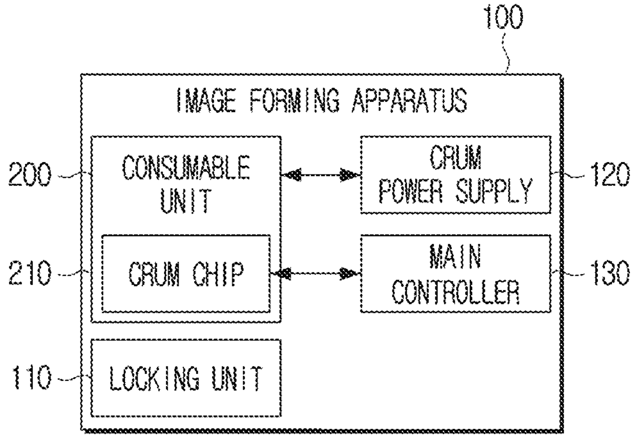
FIG. 1 is a block diagram illustrating an image forming apparatus according to an example.

FIG. 1 is a block diagram illustrating an image forming apparatus according to an example.

Referring to FIG. 1, an image forming apparatus 100 may include a locking unit 110, a customer replaceable unit monitoring (CRUM) power supply 120, a main controller 130, and a consumable unit 200.

The image forming apparatus 100 may be an apparatus capable of performing any of various image forming jobs. Examples of the image forming apparatus 100 may include a copier, a printer, a facsimile, a multi-function peripheral (MFP) including functions of these in combination as one apparatus, and the like, but there is no limitation.

A "user" may refer to a person who manipulates an image forming apparatus by using the image forming apparatus or an apparatus connected to the image forming apparatus in a wired or wireless manner.

The consumable unit 200 may be any of various types of units that is coupled to the image forming apparatus 100 and directly or indirectly involved in an image forming job. For example, in a case of a laser image forming apparatus, a charging unit, an exposing unit, a developing unit, a transfer unit, a fixing unit, various rollers, a belt, an organic photoconductor (OPC) drum, and the like may be a consumable unit. Such a unit may be deteriorated, expended, or broken due to the usage in the image forming apparatus and accordingly may be manufactured to be replaceable. Other various types of units that may be replaced based on the usage of the image forming apparatus may be defined as the consumable unit 200.

As described above, the consumable unit 200 has a limited life. As an example, a developer such as a toner may be consumed by performing an image forming job, and accordingly, if the developer runs out, the developing unit may be replaced. Accordingly, in order to perform the replacement at an appropriate time, the consumable unit 200 includes a CRUM chip 210.

The CRUM chip 210 may be mounted on the consumable unit 200 and may record various pieces of information. The CRUM chip 210 may include a memory. Accordingly, the CRUM chip 210 may be referred to by various names such as a memory, a CRUM memory, or the like, but for convenience of description, it will be referred to as the CRUM chip 210 in this specification.

The memory provided in the CRUM chip 210 may store information on various characteristics of the consumable unit 200, the CRUM chip 210 itself, the image forming apparatus 100, and the like, and usage information or programs related to an image forming job.

As an example, various programs stored in the CRUM chip 210 may include an operating system (OS) program, an encryption program, and the like, in addition to general applications. In addition, the characteristics information may include information on a manufacturer of the consumable unit 200, information on a manufacturer of the image forming apparatus 100, an apparatus name, information on a date of manufacture, a serial number, a model name, electronic signature information, an encryption key, an encryption key index, and the like of a mountable image forming apparatus. In addition, the usage information may include information indicating a number of sheets that have been printed, a number of printable sheets that are remaining, an amount of toner that is remaining, and the like. The characteristics may be differently defined as identification information.

The locking unit 110 of the image forming apparatus 100 may be included to lock the consumable unit 200 so that the consumable unit 200 is fixed to the image forming apparatus 100. Based on the consumable unit 200 being mounted on the image forming apparatus 100, the locking unit 110 may perform a locking job so that the consumable unit 200 may not be arbitrarily detached from the image forming apparatus 100.

The locking unit 110 may include a driving unit to perform a locking job, a detent to fix the consumable unit 200 at a location of the image forming apparatus 100 before performing the locking job, and a detection sensor to detect whether the locking is completed, but is not limited thereto. The driving unit may perform the locking job by rotating a gear included in the driving unit according to a rotation of a driving shaft of the consumable unit 200 but is not limited thereto. The driving unit may perform the locking job by various physical methods such as by using a clutch, a solenoid, a fixing rod, and the like. The detection sensor may detect whether the locking is completed by various methods according to the locking method of the driving unit. According to an example, based on the driving unit performing the locking job according to the gear rotation, the detection sensor may detect a rotation rate of the gear and detect whether the locking is completed. The detent may temporarily fix the consumable unit 200 at a location before locking the consumable unit 200, and in a state in which the consumable unit 200 is fixed by the detent, the user may arbitrarily detach the consumable unit 200.

The CRUM power supply 120 may supply power to the CRUM chip 210 of the consumable unit 200. In the CRUM power supply 120, a circuit may be included that is differentiated from a power input to the consumable unit 200 itself. The CRUM power supply 120 may supply the power to the CRUM chip 210 so that the CRUM chip 210 may communicate with the main controller 130 of the image forming apparatus 100 and so that data may be stored in the CRUM chip 210.

The main controller 130 may be mounted on a main body of the image forming apparatus 100 and control an operation of the image forming apparatus 100. The main body may refer to a body of the image forming apparatus 100 on which various consumable units are attachable and detachable. The main controller 130 may be implemented as a central processing unit (CPU), an application-specific integrated circuit (ASIC), a system on chip (SoC), and the like, but is not limited thereto. The main controller 130 may perform various operations based on data or instructions stored in a memory (not illustrated) of the image forming apparatus 100. For example, the main controller 130 may execute a program stored in the memory, read data stored in the memory, store new data in the memory, and the like.

The main controller 130 may communicate with the CRUM chip 210 and record a usage history of the consumable unit 200 according to an image forming job of the image forming apparatus 100 on the CRUM chip 210. The main controller 130 may store a content of the communication of the CRUM chip 210 in the memory provided in the image forming apparatus 100.

Figure 2:
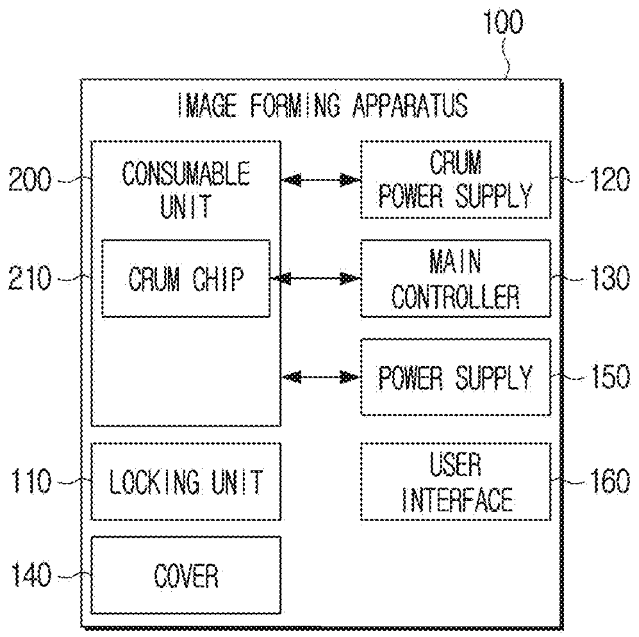
FIG. 2 is a block diagram illustrating an image forming apparatus according to an example.

FIG. 2 is a block diagram illustrating an image forming apparatus according to an example.

Referring to FIG. 2, the image forming apparatus 100 may include the locking unit 110, the CRUM power supply 120, the main controller 130, the consumable unit 200, the CRUM chip 210, a cover 140, a power supply 150, and a user interface (UI) 160. Because examples of the CRUM power supply 120, the main controller 130, the consumable unit 200, and the CRUM chip 210 have been provided above, a redundant description will not be provided here.

The cover 140 is to cover an opening of a space of the image forming apparatus 100 in which the consumable unit 200 may be mounted. The cover 140 may prevent the user from coming into contact with the consumable unit 200 during an image forming job of the image forming apparatus 100. The cover 140 may include an opening and closing sensor and may transmit an indication of whether the cover 140 is opened or closed to the main controller 130. Based on the cover 140 being opened during an image forming job, the image forming apparatus 100 may stop the image forming job due to safety.

The power supply 150 is to supply power to the consumable unit 200. The power supply 150 may supply the power to the consumable unit 200 separately from the CRUM power supply 120. The power supply 150 may supply power to the consumable unit 200 to make the consumable unit 200 usable during an image forming job. During an image forming job, a current flows through the consumable unit 200 for operating (e.g., driving) of the consumable unit 200, and accordingly, based on the cover 140 being opened, the image forming apparatus 100 may control the power supply 150 to cut the power supplied to the consumable unit 200.

The user interface 160 may provide various UI screens, and the user may touch the UI screens directly or manipulate buttons provided in the user interface 160 to input various selection commands. The selection commands may include a command to set various functions provided in the image forming apparatus 100 or to set a mode change, an operation stop and restart, and the like. In addition, the user interface 160 may directly receive an input of a job command such as a copy command, a fax command, a scan command, and the like. Further, the user interface 160 may display information related to the consumable unit 200 mounted on the image forming apparatus 100.

Figure 3:
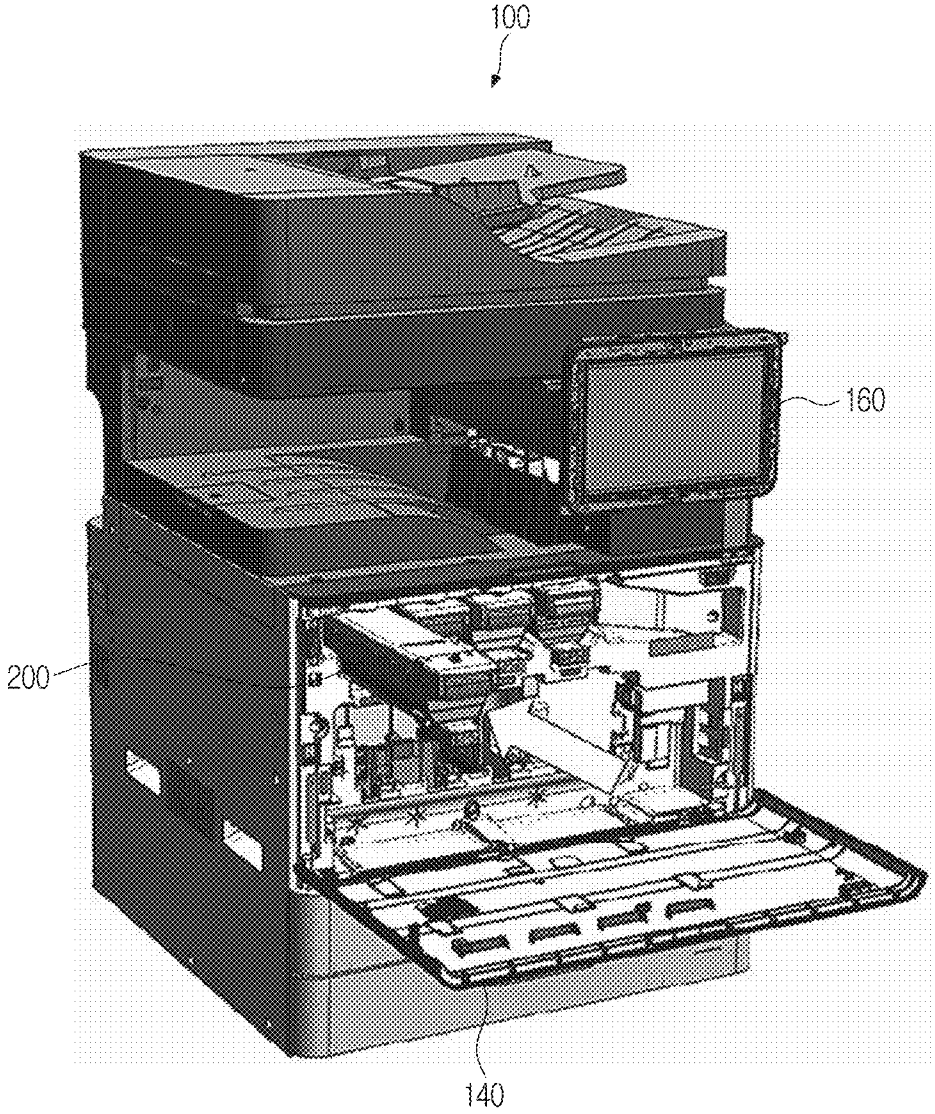
FIG. 3 is a diagram illustrating a process of fixing a consumable unit on an image forming apparatus according to an example.

FIG. 3 is a diagram illustrating a process of fixing a consumable unit on an image forming apparatus according to an example.

Referring to FIG. 3, in order to replace the consumable unit 200, the user may first open the cover 140 provided on the main body. In a case where the cover 140 is opened during an image forming job using the consumable unit 200, an image forming apparatus of the related art may immediately cut the power supplied to the consumable unit 200 including the CRUM chip 210 for safety. If such an operation is performed during data communication between the CRUM chip 210 and the main controller 130, the data may be corrupted and an undesirable value may be recorded, an omission may occur, and the like. In addition, there is a risk that the CRUM chip 210 may be damaged.

Therefore, in various examples, the immediate cutting of power as described above may be prevented by a process of ending the communication with the CRUM chip 210 according to a consumable unit 200 extract command rather than the opening and closing operation of the cover 140, and cutting the power supplied to the CRUM chip 210.

In an example, the main controller 130 may record the usage history of the consumable unit 200 according to an image forming job on the CRUM chip 210, and, based on the consumable unit 200 extract command being input during the communication with the CRUM chip 210, the main controller may end the communication with the CRUM chip 210. Based on the communication with the CRUM chip 210 ending, the main controller 130 may control the CRUM power supply 120 to cut the power supplied to the CRUM chip 210. Based on the power supplied to the CRUM chip 210 being cut, the main controller 130 may control the locking unit 110 to unlock the consumable unit 200.

The consumable unit extract command may be input to the image forming apparatus 100 by the user to separate the consumable unit 200 fixed and mounted onto the image forming apparatus 100. The consumable unit extract command may be input through the user interface 160 of the image forming apparatus 100. In various examples, the user may input the command by pressing a consumable unit extract button separately provided on the image forming apparatus 100.

The end of the communication between the main controller 130 and the CRUM chip 210 may refer to finishing communication by ending the transmission and reception of data such as the usage history of the consumable unit 200 according to an image forming job. In various examples, the state of the end of the communication may refer to a state in which the data transmission and reception have completed and the storage of data to be stored is completed.

Based on the power supplied to the CRUM chip 210 being cut, the main controller 130 may display information on the user interface 160 that the consumable unit 200 is extractable. In various examples, the information that the consumable unit 200 is able to be separated may be guided to the user with a separate noise or the like.

The main controller 130 may unlock the consumable unit 200 so that the user is able to separate the consumable unit 200 after the power supplied to the CRUM chip 210 is cut. The user may separate the consumable unit 200 from the image forming apparatus 100 based on the locking unit 110 performing the unlocking after the power supplied to the CRUM chip 210 is cut, and accordingly, it is possible to prevent the damage of data or the damage of the CRUM chip 210 due to the power being immediately cut during the communication between the main controller 130 and the CRUM chip 210.

The main controller 130 may unlock the consumable unit 200 based on the power supplied to the CRUM chip 210 being cut, but is not limited thereto. In various examples, the main controller 130 may control the locking unit 110 to unlock the consumable unit 200 based on the cover 140 being opened, after the power supplied to the CRUM chip 210 is cut.

According to an example, the consumable unit 200 may be mounted on the image forming apparatus 100 and the cover 140 may cover the opening of the space on which the consumable unit 200 is mounted.

Based on the consumable unit 200 being mounted on the image forming apparatus 100 and the cover 140 being closed, the main controller 130 may control the locking unit 110 to lock the consumable unit 200. Based on the locking of the consumable unit 200 being completed, the main controller 130 may control the power supply 150 and the CRUM power supply 120 to supply the power to the consumable unit 200 and the CRUM chip 210, respectively. The power supply 150 may supply power to the consumable unit 200 itself and the CRUM power supply 120 may supply power to the CRUM chip 210.

Based on the cover 140 being opened during an operation, the main controller 130 may control the power supply 150 to immediately cut the power supplied to the consumable unit 200. Accordingly, it is possible to prevent an accident such as electric shock in a situation in which the user arbitrarily opens the cover 140. The main controller 130 may control the CRUM power supply 120 to maintain the power supplied to the CRUM chip 210, although the cover 140 is opened. Accordingly, although the cover 140 is opened during the operation of the image forming apparatus 100 and the power supplied to the consumable unit 200 is cut, the power to the CRUM chip 210 may be maintained, and therefore the main controller 130 may maintain the communication with the CRUM chip 210. In addition, the user may not arbitrarily separate the consumable unit 200 as the consumable unit 200 is locked by the locking unit 110, and accordingly, it is possible to prevent the immediate stopping of communication between the main controller 130 and the CRUM chip 210.

Figure 4:
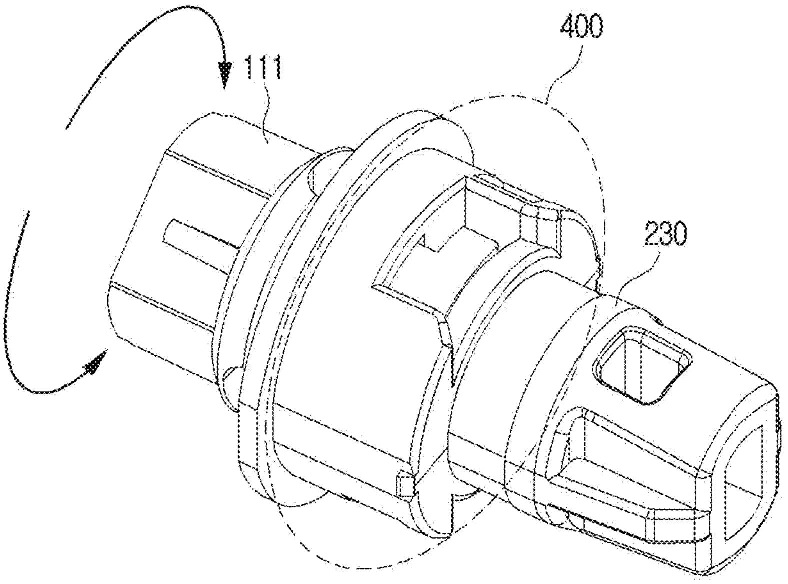
FIG. 4 is a diagram illustrating a structure of a locking unit according to an example.
Figure 4:
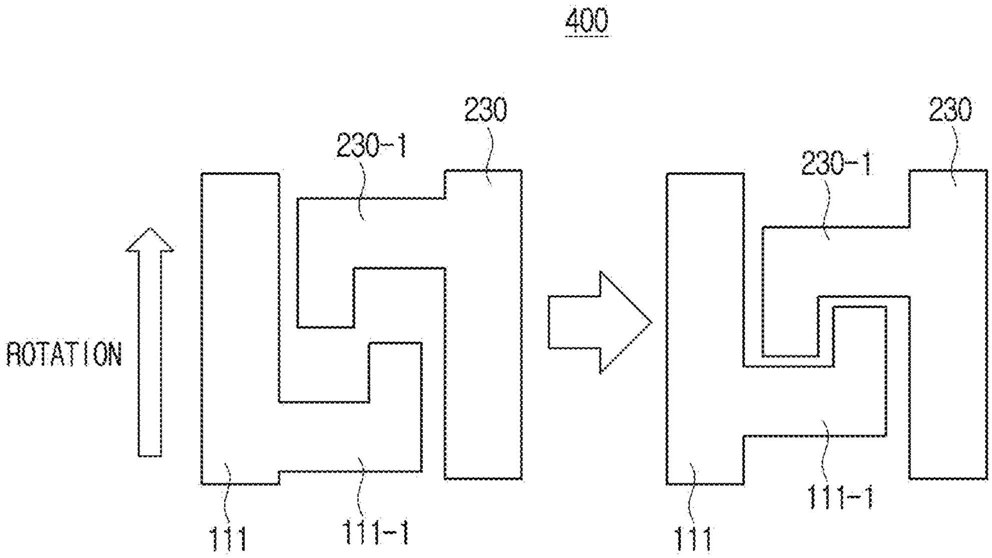

FIG. 4 is a diagram illustrating a structure of a locking unit according to an example.

Referring to FIG. 4, the locking unit 110 shows an example locking method using a rotation gear. In an example, a driving unit 111 of the locking unit 110 may include a protruded structure with a groove 111-1. Based on the consumable unit 200 being mounted on the image forming apparatus 100, the driving unit 111 of the locking unit 110 may be combined with a coupler 230 of the consumable unit 200. The coupler 230 of the consumable unit 200 may include a separate protruded groove 230-1 to fit to the groove 111-1 of the driving unit 111. Referring to a lower part 400 of FIG. 4, based on the consumable unit 200 being mounted on the image forming apparatus 100, the main controller 130 may rotate the driving unit 111 in one direction to lock the consumable unit 200 so that the groove 111-1 of the driving unit 111 is engaged with the groove 230-1 of the coupler 230. Since the two grooves are engaged, the consumable unit 200 is in a locked state in which the user may not arbitrarily separate the consumable unit 200. Based on the image forming apparatus 100 using the consumable unit 200, the main controller 130 may control the driving unit 111 of the locking unit 110 to maintain the rotation in one direction to prevent separation of the consumable unit 200 from the image forming apparatus 100. In this case, the coupler 230 of the consumable unit 200 may rotate in one direction by being engaged with the driving unit 111 of the locking unit 110.

To unlock the consumable unit 200, the main controller 130 may rotate the driving unit 111 in a direction opposite to the one direction. In this case, the engagement of the groove 111-1 of the driving unit 111 with the groove 230-1 of the coupler 230 may be released and the consumable unit 200 may be unlocked. Based on the consumable unit 200 being unlocked, the user may arbitrarily separate the consumable unit 200 from the image forming apparatus 100.

Figure 5:
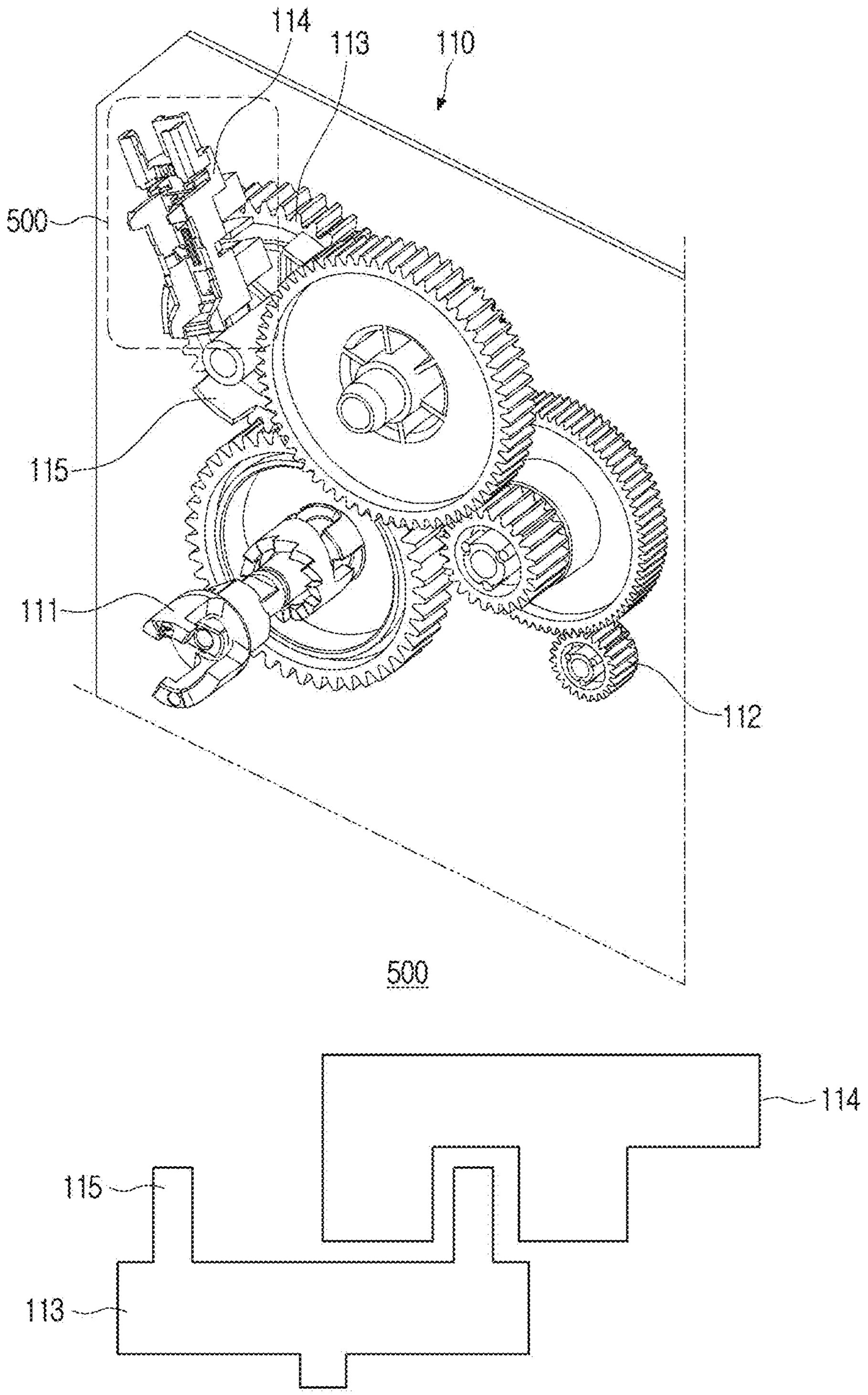
FIG. 5 is a diagram illustrating a method for detecting a locked state of a locking unit according to an example.

FIG. 5 is a diagram illustrating a method for detecting a locked state of a locking unit according to an example.

Referring to FIG. 5, the locking unit 110 may include a motor 112 to rotate the driving unit 111. In addition, the locking unit 110 may include a detection sensor 114 to detect whether the consumable unit 200 is locked. In FIG. 5, it is illustrated that the locking unit 110 includes four gears (e.g., gear 113), but there is no limitation thereto, and the locking unit 110 may be variously designed in consideration of a rotation torque of the motor 112. According to an example, based on rotation of the motor 112, the driving unit 111 may rotate according to the rotation of the gear 113. The driving unit 111 may rotate to lock the consumable unit 200. An example of the locking of the consumable unit 200 is described above, and therefore the overlapped description will not be repeated.

The detection sensor 114 may include a photo-interrupter but is not limited thereto. The detection sensor 114 may detect a rib 115 included on the gear 113. The rib 115 may refer to a protrusion located on the gear 113 at regular intervals. Referring to a lower part 500 of FIG. 5, based on the rib 115 passing through the detection sensor 114 according to the rotation of the gear 113, the detection sensor 114 may transmit a detection signal to the main controller 130. The main controller 130 may count the number of signals output from the detection sensor 114 and detect the lock of the consumable unit 200. According to an example, based on the main controller 130 controlling the motor 112 to rotate the driving unit 111 to lock the consumable unit 200, the gear 113 of the locking unit 110 rotates and the signal is detected by the detection sensor 114. Since the rib 115 of the gear 113 is located at regular intervals, the main controller 130 may identify a rotation angle of the gear 113 based on the number of times of generation of signals. Based on a predetermined number or more of signals being detected from the detection sensor 114, the main controller 130 may identify that the driving unit 111 rotates at a certain angle or more and the consumable unit 200 is engaged with the coupler 230.

Figure 6:
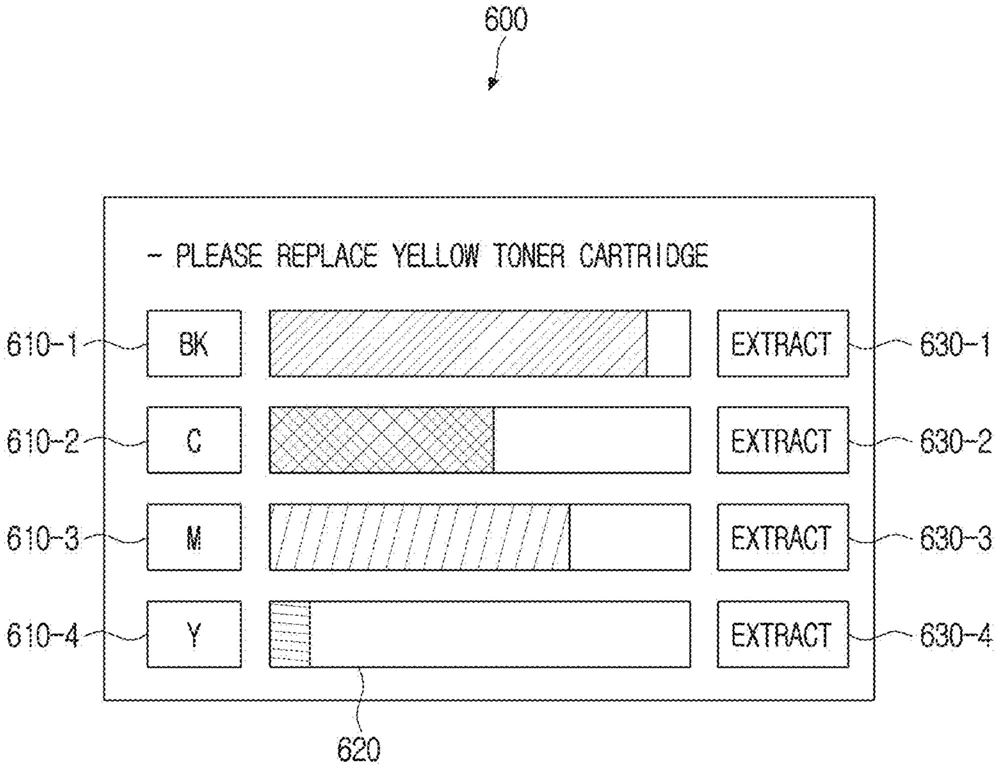
FIG. 6 is a screen displayed on a user interface according to an example.

FIG. 6 is a screen displayed on a user interface according to an example.

Referring to FIG. 6, a screen 600 displayed on the user interface 160 may include types 610-1, 610-2, 610-3, and 610-4 of the consumable units 200 mounted on the image forming apparatus 100, a current state 620 of each consumable unit 200, and extract command input buttons 630-1, 630-2, 630-3, and 630-4 respectively for the consumable units 200. There is no limitation thereto, and the main controller 130 may display data stored in the CRUM chip 210 included in each consumable unit 200. In addition, the main controller 130 may display a message indicating that the consumable unit 200 should be replaced.

The user may input the consumable unit extract commands 630-1 to 630-4 from the screen 600 displayed on the user interface 160 to separate the respective consumable unit 200. According to an example, based on a Y toner extract command 630-4 being input during the communication between the main controller 130 and the CRUM chip 210 of the Y toner 610-4, the main controller 130 may end the communication with a CRUM chip 210 of the Y toner 610-4 and control the CRUM power supply 120 to cut the power supplied to the CRUM chip 210 of the Y toner 610-4. In addition, the main controller 130 may control the power supply 150 to cut the power for the Y toner 610-4 itself. Based on the power supplied to the CRUM chip 210 of the Y toner 610-4 being cut, the main controller 130 may control the locking unit 110 to unlock the Y toner 610-4.

According to an example, based on the consumable unit extract command being input, the power of all consumable units 200 including the consumable unit 200, of which the extract command is input, may be cut. In addition, although the extract command for one consumable unit 200 is input, the main controller 130 may control the locking unit 110 to unlock all consumable units 200.

According to an example, based on the cover 140 being opened during the communication with the CRUM chip 210, the main controller 130 may recognize that the consumable unit extract command is input and end the communication with the CRUM chip 210. The main controller 130 may control the CRUM power supply 150 to cut the power supplied to the CRUM chip 210. Based on the power supplied to the CRUM chip 210 being cut, the main controller 130 may control the locking unit 110 to unlock the consumable unit 200. Accordingly, the image forming apparatus 100 may replace the consumable unit 200, even if the user opens the cover 140 without inputting the consumable unit extract command.

According to an example, based on the cover 140 being opened without inputting the consumable unit extract command, the main controller 130 may display a message notifying that the consumable unit 200 is locked on the user interface 160. There is no limitation thereto, and the main controller 130 may notify the user that the consumable unit 200 is locked with a separate warning sound. In a case of displaying the message notifying that the consumable unit 200 is locked on the user interface 160, the main controller 130 may display a screen capable of inputting the consumable unit extract command on the user interface 160.

According to an example, based on the cover 140 being opened and closed in a state in which the consumable unit extract command is not input, the main controller 130 may use the consumable unit 200 based on data received from the CRUM chip 210 before the cover 140 is opened. Although the cover 140 is opened, the consumable unit 200 is maintained to be locked by the locking unit 110, based on the consumable unit 200 extract command not being input, and accordingly, the consumable unit 200 is not separable from the image forming apparatus 100. Therefore, in a situation of using the consumable unit 200 for performing an image forming job, the main controller 130 may use the consumable unit 200 based on data received from the CRUM chip 210 before the cover 140 is opened, without starting the communication with the CRUM chip 210 again.

According to an example, based on the cover 140 being opened and closed within a certain time in a state in which the consumable unit extract command is not input, the main controller 130 may use the consumable unit 200 based on the data received from the CRUM chip 210 before the cover is opened. Although the consumable unit 200 is locked by the locking unit 110 in a situation in which the cover 140 is opened, the user may damage the locking unit 110 and replace the consumable unit 200. Accordingly, based on the certain time elapsing after the cover 140 is opened, the main controller 130 may communicate with the CRUM chip 210 to confirm the consumable unit 200 again.

Figure 7:
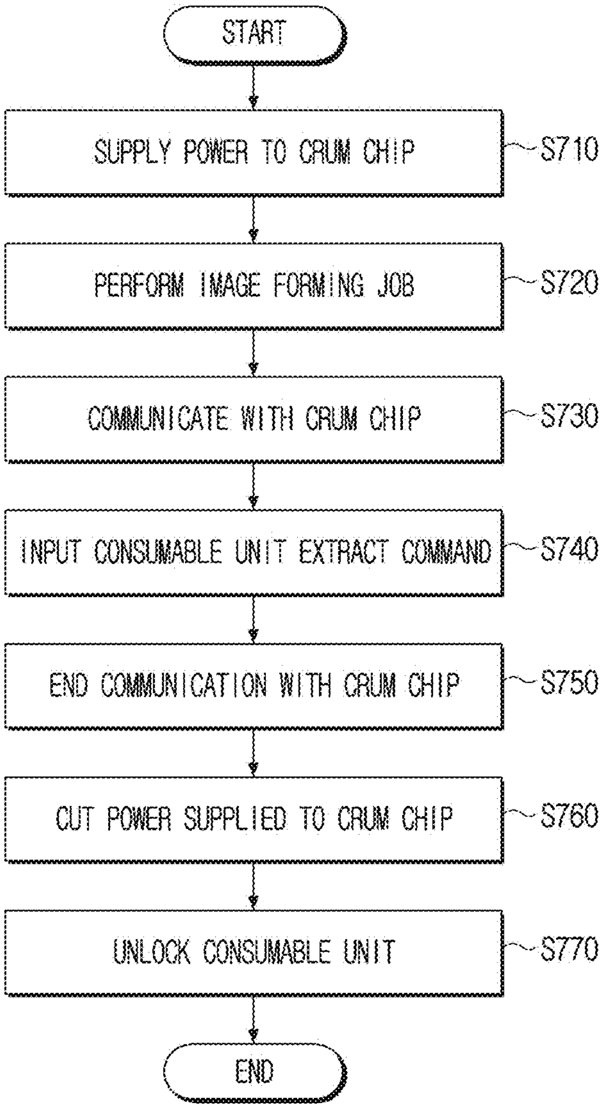
FIG. 7 is a flowchart illustrating a method for replacing a consumable unit of an image forming apparatus according to an example.

FIG. 7 is a flowchart illustrating a method for replacing a consumable unit of an image forming apparatus according to an example.

According to FIG. 7, a method for replacing a consumable unit of an image forming apparatus using the consumable unit including a CRUM chip may include supplying power to the CRUM chip in a state in which the consumable unit is mounted on the image forming apparatus in operation 8710, performing an image forming job by using the consumable unit in operation S720, recording a usage history of the consumable unit according to the image forming job on the CRUM chip by communication between a main controller of the image forming apparatus and the CRUM chip in operation 8730, based on a consumable unit extract command being input during the communication with the CRUM chip in operation 8740, ending the communication with the CRUM chip in operation 8750 and cutting the power supplied to the CRUM chip in operation 8760, and controlling a locking unit to unlock the consumable unit that is locked to be fixed to the image forming apparatus in operation 8770. The content related to the consumable unit and the CRUM chip, the content related to the communication with the CRUM chip, and the content related to the control of the locking unit have been described above, and therefore the overlapped description will not be repeated.

Figure 8:
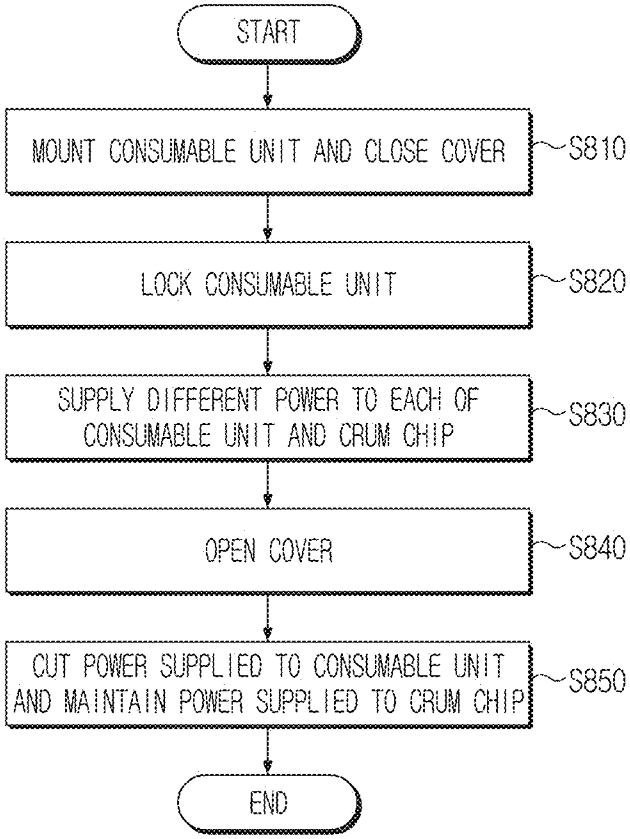
FIGS. 8 to 10 are flowcharts illustrating methods for replacing a consumable unit of an image forming apparatus according to various examples.
Figure 9:
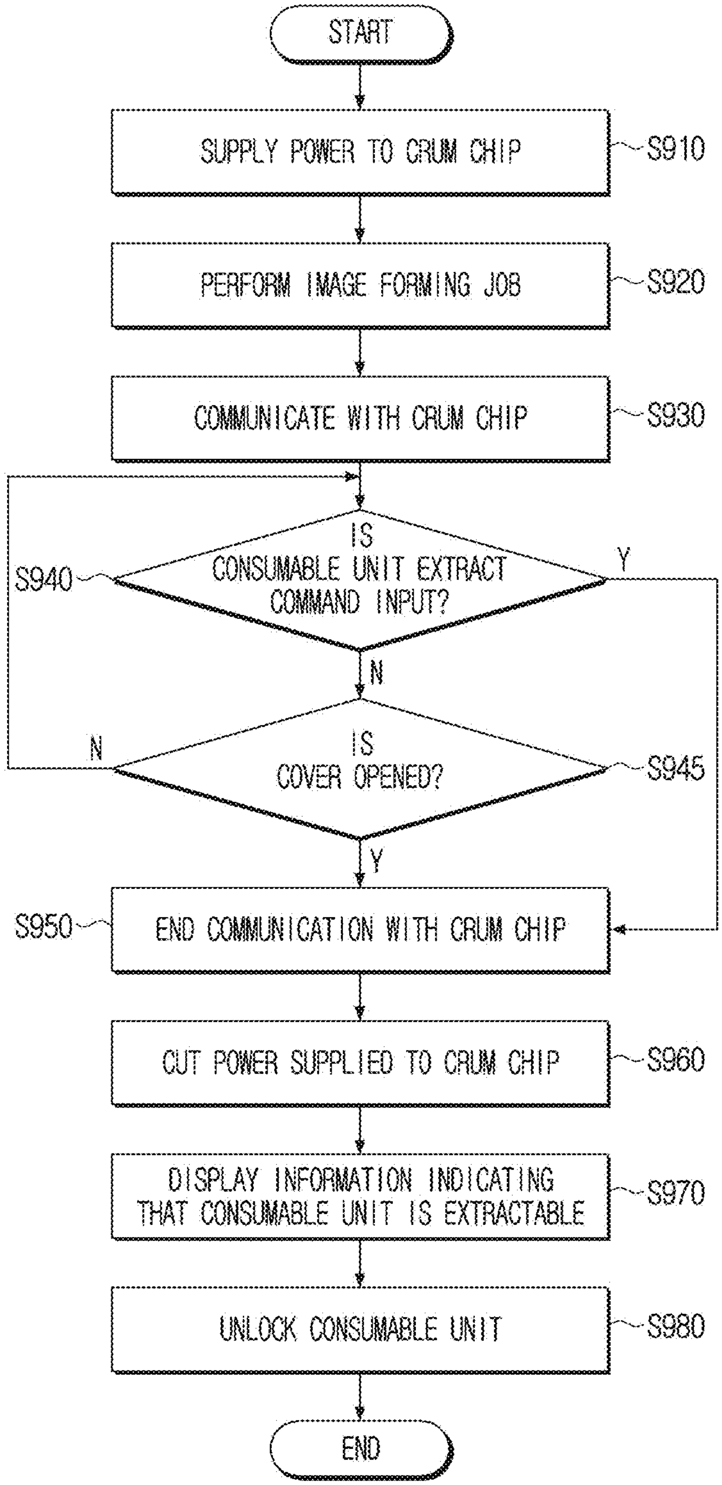
Figure 10:
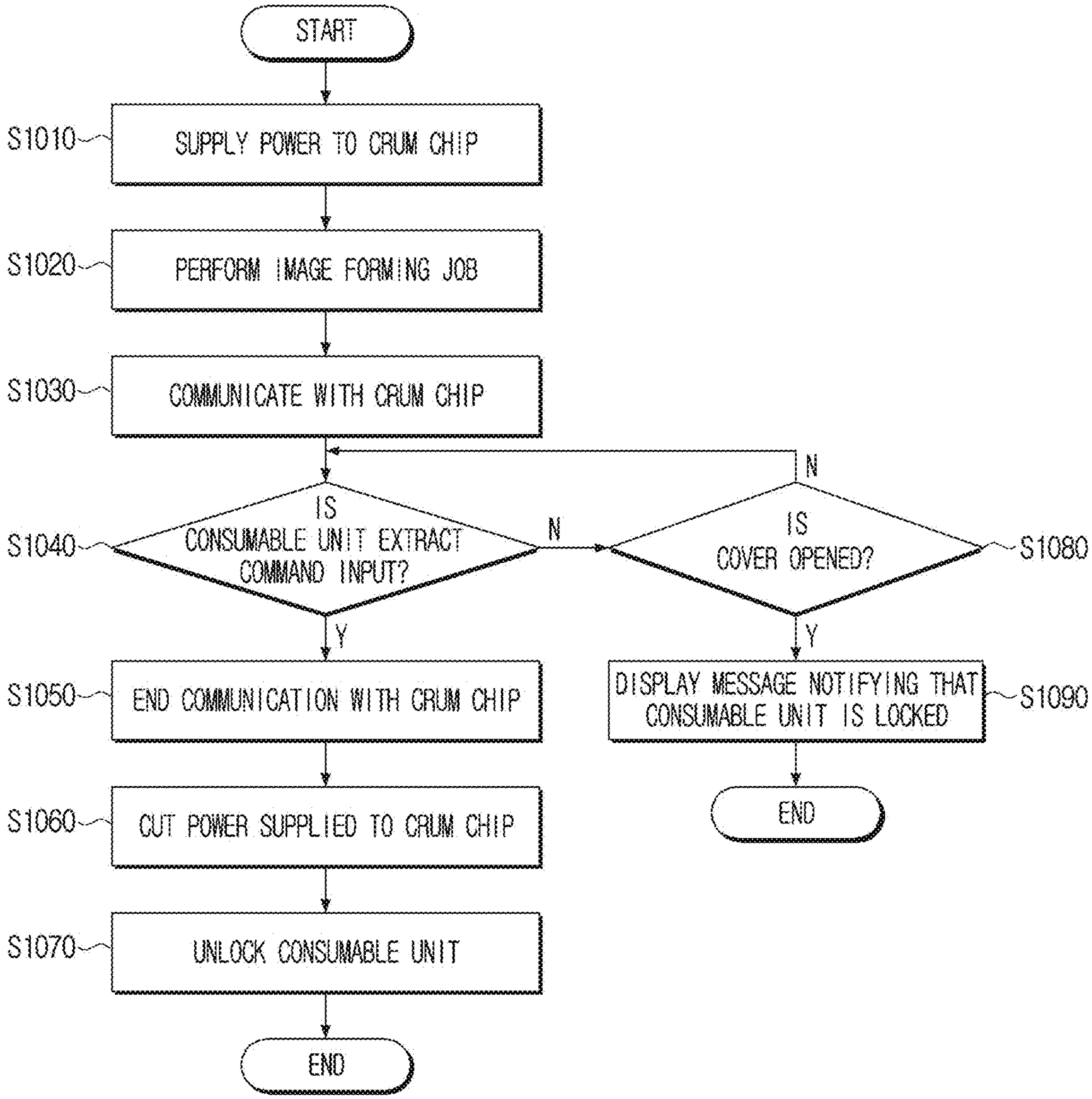

FIGS. 8 to 10 are flowcharts illustrating methods for replacing a consumable unit of an image forming apparatus according to various examples.

Referring to FIG. 8, an example method for replacing the consumable unit of the image forming apparatus may further include, based on the consumable unit being mounted on the image forming apparatus through an opening of a space in which the consumable unit is mounted and a cover for covering the opening of the space being closed in operation 8810, controlling the locking unit to lock the consumable unit in operation 8820, based on the locking of the consumable unit being completed, supplying different powers to the consumable unit and the CRUM chip, respectively in operation 8830, and, based on the cover being opened in operation 8840, immediately cutting the power supplied to the consumable unit and maintaining the power supplied to the CRUM chip in operation 8850. The content related to the control of the locking unit and the content related to the application of different powers to the consumable unit and the CRUM chip respectively have been described above, and therefore the overlapped description will not be repeated.

Referring to FIG. 9, an example method for replacing the consumable unit may further include supplying power to the CRUM chip in a state in which the consumable unit is mounted on the image forming apparatus in operation S910, performing an image forming job by using the consumable unit in operation S920, recording a usage history of the consumable unit according to the image forming job on the CRUM chip by communication between a main controller of the image forming apparatus and the CRUM chip in operation S930, based on the cover for covering the opening of the space in which the consumable unit is mounted being opened in operation S945 without an input of a consumable unit extract command in operation S940 during the communication with the CRUM chip in operation S930, ending the communication with the CRUM chip by recognizing that the consumable unit extract command is input in operation S950, and cutting the power supplied to the CRUM chip in operation S960. The content related to the opening of the cover during the communication with the CRUM chip has been described above, and therefore the overlapped description will not be repeated.

An example method for replacing the consumable unit of the image forming apparatus may further include inputting the consumable unit extract command through a user interface. In addition, the consumable unit replacing method may further include, based on the power supplied to the CRUM chip being cut in operation S960, displaying information indicating that the consumable unit is extractable on the user interface in operation S970. The content related to the inputting of the consumable unit extract command through the user interface and the content related to the displaying of the information indicating that the consumable unit is extractable on the user interface have been described above, and therefore the overlapped description will not be repeated.

According to an example, a method for replacing the consumable unit of the image forming apparatus may further include cutting the power supplied to the CRUM chip in operation S960 and unlocking the consumable unit in operation S980. The unlocking of the consumable unit may be performed by controlling the locking unit. The content related to the unlocking of the consumable unit has been descried above and the overlapped description will not be repeated.

Referring to FIG. 10, an example consumable unit replacing method may further include, based on the cover being opened in operation S1080 in a state in which the consumable unit extract command is not input in operation S1040 during the communication with the CRUM chip in operation S1030, displaying a message notifying that the consumable unit is locked on the user interface in operation S1090. Operations S1010, S1020, S1050, S1060, and S1070 are substantially the same as operations S910, S920, S950, S960, and S970 described above. Also, the content related to the displaying of the message notifying that the consumable unit is locked has been described above, therefore the overlapped description will not be repeated.

According to an example, the consumable unit replacing method may further include, based on the cover being opened in a state in which the consumable unit extract command is not input and then closed within a certain time, using the consumable unit based on data received from the CRUM chip before the cover is opened. The content related to the case in which the cover is opened and then closed within a certain time has been described above, and therefore the overlapped description will not be repeated.

Figure 11:
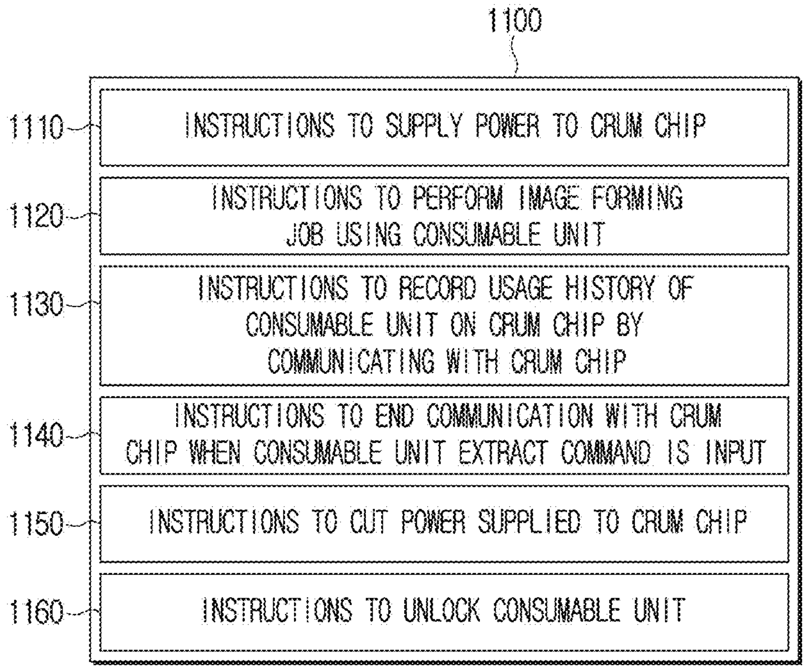
FIG. 11 is a diagram illustrating instructions stored in a non-transitory computer-readable recording medium according to an example.

FIG. 11 is a diagram illustrating instructions stored in a non-transitory computer-readable recording medium according to an example.

Referring to FIG. 11, a non-transitory computer-readable recording medium 1100 may store instructions related to the operations of the image forming apparatus described above. For example, the non-transitory computer-readable recording medium 1100 may include instructions 1110 for supplying power to the CRUM chip in a state in which the consumable unit is mounted on the image forming apparatus, instructions 1120 for performing an image forming job by using the consumable unit, instructions 1130 for recording the usage history of the consumable unit according to the image forming job on the CRUM chip by communicating by the main controller of the image forming apparatus with the CRUM chip, instructions 1140 for, based on the consumable unit extract command being input during the communication with the CRUM chip, ending communication with the CRUM chip, instructions 1150 for, based on the communication with the CRUM chip ending, cutting the power supplied to the CRUM chip, and instructions 1160 for controlling the locking unit to unlock the consumable unit locked to be fixed to the image forming apparatus. Each instruction may be manufactured and recorded in various types of program languages. In addition, instructions may be combined with each other and recorded on a non-transitory recording medium in a form of a computer readable instructions module.

Such a non-transitory computer-readable recording medium may be a read-only memory (ROM), a random-access memory (RAM), a flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk drive, a solid-state drive (SSD), and any device capable of storing machine readable instructions, related data, data files, and data structures, and providing machine readable instructions, related data, data files, and data structures to a processor or a computer so that the processor or the computer executes the instructions.

While examples of the disclosure have been shown and described, the disclosure is not limited to the aforementioned examples, and it is apparent that various modifications can be made without departing from the gist of the disclosure as claimed by the appended claims. Also, it is intended that such modifications are not to be interpreted independently from the technical idea or prospect of the disclosure.

What is claimed is:

1. An image forming apparatus comprising:

a locking unit to lock a consumable unit to the image forming apparatus, the consumable unit including a customer replaceable unit monitoring (CRUM) chip;

a CRUM power supply to supply power to the CRUM chip; and a main controller to perform an image forming job using the consumable unit, wherein the main controller is to:

record a usage history of the consumable unit according to the image forming job on the CRUM chip by communicating with the CRUM chip;

based on a consumable unit extract command being input during the communication with the CRUM chip, end the communication with the CRUM chip and control the CRUM power supply to cut the power supplied to the CRUM chip after the communication with the CRUM chip has ended; and based on the power cutting, control the locking unit to unlock the consumable unit.

2. The image forming apparatus according to claim 1, further comprising:

a cover to cover an opening of a space in which the consumable unit is to be mounted; and a power supply to supply power to the consumable unit, wherein the main controller is to:

based on the consumable unit being mounted on the image forming apparatus and the cover being closed, control the locking unit to lock the consumable unit;

based on the locking being completed, control the power supply and the CRUM power supply to supply power to the consumable unit and the CRUM chip, respectively; and based on the cover being opened, control the power supply to cut the power supplied to the consumable unit and control the CRUM power supply to maintain the power supplied to the CRUM chip.

3. The image forming apparatus according to claim 1, further comprising:

a cover to cover an opening of a space in which the consumable unit is to be mounted, wherein the controller is to, based on the cover being opened during the communication with the CRUM chip, end the communication with the CRUM chip, control the CRUM power supply to cut the power supplied to the CRUM chip, and based on the power being cut, control the locking unit to unlock the consumable unit.

4. The image forming apparatus according to claim 1, further comprising:

a user interface, wherein the consumable unit extract command is input through the user interface, and wherein the main controller is to, based on the power being cut, display information indicating that the consumable unit is extractable on the user interface.

5. The image forming apparatus according to claim 1, further comprising:

a cover to cover an opening of a space in which the consumable unit is to be mounted, wherein the main controller is to, based on the cover being opened after the power is cut, control the locking unit to unlock the consumable unit.

6. The image forming apparatus according to claim 1, further comprising:

a cover to cover an opening of a space in which the consumable unit is to be mounted; and a user interface, wherein the controller is to, based on the cover being opened in a state in which the consumable unit extract command is not input, control the user interface to display a message notifying that the consumable unit is locked.

7. The image forming apparatus according to claim 1, further comprising:

a cover to cover an opening of a space in which the consumable unit is to be mounted, wherein the main controller is to, based on the cover being opened in a state in which the consumable unit extract command is not input and closed within a certain time, use the consumable unit based on data received from the CRUM chip before the cover is opened.

8. A consumable unit replacing method of an image forming apparatus using the consumable unit comprising a customer replaceable unit monitoring (CRUM) chip, the method comprising:

supplying power to the CRUM chip in a state in which the consumable unit is mounted on the image forming apparatus;

performing an image forming job using the consumable unit;

recording a usage history of the consumable unit according to the image forming job on the CRUM chip by communication of a main controller of the image forming apparatus with the CRUM chip;

based on a consumable unit extract command being input during the communication with the CRUM chip, ending the communication with the CRUM chip and cutting the power supplied to the CRUM chip after communication with the CRUM chip has ended; and controlling a locking unit to unlock the consumable unit which is locked to the image forming apparatus.

9. The consumable unit replacing method according to claim 8, further comprising:

based on the consumable unit being mounted on the image forming apparatus through an opening of a space in the image forming apparatus, and a cover to cover the opening of the space being closed, controlling the locking unit to lock the consumable unit;

based on the locking being completed, supplying different power to each of the consumable unit and the CRUM chip; and based on the cover being opened, cutting the power supplied to the consumable unit and maintaining the power supplied to the CRUM chip.

10. The consumable unit replacing method according to claim 8, wherein the cutting of the power supplied to the CRUM chip comprises, based on a cover to cover an opening of a space in the image forming apparatus being opened during the communication with the CRUM chip, ending the communication with the CRUM chip and cutting the power supplied to the CRUM chip.

11. The consumable unit replacing method according to claim 8, further comprising:

receiving an input of the consumable unit extract command through a user interface; and based on the power being cut, displaying information indicating that the consumable unit is extractable on the user interface.

12. The consumable unit replacing method according to claim 8, wherein the controlling of the locking unit comprises, based on a cover being opened after the power is cut, controlling the locking unit to unlock the consumable unit, and wherein the cover is to cover an opening of a space in which the consumable unit is mounted.

13. The consumable unit replacing method according to claim 8, further comprising:

based on a cover being opened in a state in which the consumable unit extract command is not input, displaying a message notifying that the consumable unit is locked on a user interface, wherein the cover is to cover an opening of a space in which the consumable unit is mounted.

14. The consumable unit replacing method according to claim 8, further comprising:

based on a cover being opened in a state in which the consumable unit extract command is not input and closed within a certain time, using the consumable unit based on data received from the CRUM chip before the cover is opened, wherein the cover is to cover an opening of a space in which the consumable unit is mounted.

15. A non-transitory recording medium including instructions for performing a consumable unit replacing method of an image forming apparatus using the consumable unit comprising a customer replaceable unit monitoring (CRUM) chip are stored, the non-transitory recording medium comprising:

instructions to supply power to the CRUM chip in a state in which the consumable unit is mounted on the image forming apparatus;

instructions to perform an image forming job using the consumable unit;

instructions to record a usage history of the consumable unit according to the image forming job on the CRUM chip by communicating of a main controller of the image forming apparatus with the CRUM chip;

instructions to, based on a consumable unit extract command being input during the communication with the CRUM chip, end the communication with the CRUM chip and cut the power supplied to the CRUM chip after communication with the CRUM chip has ended; and instructions to control a locking unit to unlock the consumable unit which is locked to the image forming apparatus.

* * * * *